(12) United States Patent
Kweon

(10) Patent No.: US 12,439,461 B2
(45) Date of Patent: Oct. 7, 2025

(54) METHOD AND APPARATUS FOR MODIFYING PDU SESSION AND ALWAYS-ON PDU SESSION IN WIRELESS COMMUNICATION SYSTEM

(71) Applicant: SAMSUNG ELECTRONICS CO., LTD., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 17/758,448

(22) PCT Filed: Jan. 5, 2021

(86) PCT No.: PCT/KR2021/000092
§ 371 (c)(1),
(2) Date: Jul. 6, 2022

(87) PCT Pub. No.: WO2021/141363
PCT Pub. Date: Jul. 15, 2021

(65) Prior Publication Data
US 2023/0052869 A1   Feb. 16, 2023

(30) Foreign Application Priority Data

Jan. 6, 2020 (KR) .................. 10-2020-0001666
Jan. 7, 2020 (KR) .................. 10-2020-0002297

(51) Int. Cl.
*H04W 76/10* (2018.01)
*H04W 76/20* (2018.01)

(52) U.S. Cl.
CPC ........... *H04W 76/10* (2018.02); *H04W 76/20* (2018.02)

(58) Field of Classification Search
CPC ..... H04W 76/10; H04W 76/20; H04W 76/27; H04W 76/12; H04W 76/22; H04W 28/02
See application file for complete search history.

(56) References Cited

U.S. PATENT DOCUMENTS 10,419,980 B2   9/2019   Lee et al.
10,462,840 B2   10/2019  Dao et al.
(Continued)

FOREIGN PATENT DOCUMENTS

CN   110447302 A   11/2019
CN   110519805 A   11/2019
(Continued)

OTHER PUBLICATIONS

3GPP ETSI TS 123.502, Sec.4.3.3, V15.2.0 (Year: 2018).*
(Continued)

*Primary Examiner* — Jung H Park

(57) ABSTRACT

The present disclosure relates to a communication technique that combines a 5G communication system for supporting a higher data transmission rate than a 4G system with IoT technology, and a system therefor. The present disclosure may be applied to intelligent services (e.g. smart homes, smart buildings, smart cities, smart cars or connected cars, healthcare, digital education, retail businesses, security and safety-related services, etc.) on the basis of 5G communication technology and IoT-related technology. A method performed by a session management function (SMF) entity in a communication system, according to one embodiment of the present disclosure, may comprise the steps of: performing a packet data unit (PDU) session establishment procedure; identifying a QoS flow generated for ultra reliable low latency communication (URLLC) in a PDU session; identifying whether an indicator indicating that the PDU session is an Always-on PDU Session has ever been transmitted to a terminal; and when it is identified that the
(Continued)

indicator has not been transmitted to the terminal, transmitting the indicator to the terminal.

8 Claims, 11 Drawing Sheets

(56) References Cited

U.S. PATENT DOCUMENTS

| | | | |
|---|---|---|---|
| 10,548,165 B2 | 1/2020 | Akkarakaran et al. | |
| 11,477,689 B2 | 10/2022 | Wei et al. | |
| 2018/0167164 A1 | 6/2018 | Lin et al. | |
| 2019/0364541 A1 | 11/2019 | Ryu | |
| 2020/0214054 A1* | 7/2020 | Qiao | H04L 47/824 |
| 2021/0076444 A1* | 3/2021 | Shu | H04W 8/08 |
| 2021/0153286 A1* | 5/2021 | Park | H04W 76/22 |
| 2021/0235517 A1* | 7/2021 | Won | H04W 80/10 |
| 2022/0287116 A1* | 9/2022 | Kim | H04W 76/12 |

FOREIGN PATENT DOCUMENTS

| | | | |
|---|---|---|---|
| IN | 201937037748 A1 | 11/2023 | |
| KR | 10-2019-0140025 A | 12/2019 | |
| WO | 2019114810 A1 | 6/2019 | |
| WO | 2019182430 A1 | 9/2019 | |
| WO | 2019194473 A1 | 10/2019 | |

OTHER PUBLICATIONS

European Patent Office, "Supplementary European Search Report," dated Nov. 23, 2022, in connection with European Patent Application No. 21737965.0, 12 pages.
3GPP TS 23.502 V16.3.0 (Dec. 2019) Technical Specification; 3rd Generation Partnership Project; Technical Specification Group Services and System Aspects; Procedures for the 5G System (5GS); Stage 2 (Release 16); 558 pages.
International Search Report and Written Opinion of the International Searching Authority in connection with International Application No. PCT/KR2021/000092 issued Apr. 8, 2021, 9 pages.
Samsung, "Handling the always-on PDU session for UP activation during UE CM-CONNECTED transition", S2-1909624, 3GPP TSG-SA WG2 Meeting #135, Split, Croatia, Oct. 14-18, 2019, 45 pages.
Nokia et al., "5G URLLC Handling PDU Session Failure", S2-1910092, 3GPP TSG-SA WG2 Meeting #135, Split, Croatia, Oct. 14-18, 2019, 7 pages.
Office Action issued Jun. 22, 2024, in connection with Chinese Patent Application No. 202180008306.X, 17 pages.
The Second Office Action issued Nov. 20, 2024, in connection with Chinese Patent Application No. 202180008306.X, 12 pages.
Notification of Fulfilling of Registration Formality issued Feb. 17, 2025, in connection with Chinese Patent Application No. 202180008306.X, 9 pages.
Nokia et al., "23.501 §5.6.2: Registration and PDU session setup for always-on," S2-174303, SA WG2 Meeting #122, San Jose del Cabo, Mexico, Jun. 26-30, 2017, 3 pages.

* cited by examiner

METHOD AND APPARATUS FOR MODIFYING PDU SESSION AND ALWAYS-ON PDU SESSION IN WIRELESS COMMUNICATION SYSTEM

CROSS-REFERENCE TO RELATED APPLICATIONS

This application is a 371 of International Application No. PCT/KR2021/000092, filed Jan. 5, 2021, which claims priority to Korean Patent Application No. 10-2020-0001666, filed Jan. 6, 2020, and Korean Patent Application No. 10-2020-0002297, filed Jan. 7, 2020, the disclosures of which are herein incorporated by reference in their entirety.

BACKGROUND

1. Field

The disclosure relates to contents about a communication system, and particularly, to a method of managing a PDU session for a URLLC service.

2. Description of Related Art

In order to satisfy wireless data traffic demands that tend to increase after 4th generation (4G) communication system commercialization, efforts to develop an enhanced 5G communication system [or a pre-5G communication system] are being made. For this reason, the 5G communication system [or pre-5G communication system] is called a beyond 4G network communication system or a post LTE system.

In order to achieve a high data transfer rate, an implementation of the 5G communication system in a mmWave band (e.g., a 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system.

In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

In addition, in the 5G system, the support of various services compared to the existing 4G system is taken into consideration. For example, the most representative services may include an enhanced mobile broad band (eMBB), ultra-reliable and low latency communication (URLLC), massive machine type communication (mMTC), an evolved multimedia broadcast/multicast service (eMBMS), etc. Furthermore, a system that provides the URLLC service may be called a URLLC system, a system that provides the eMBB service may be called an eMBB system, etc. Furthermore, terms called a service and a system may be interchangeably used.

Among them, the URLLC service is a service which is newly taken into consideration in a 5G system unlike in the existing 4G system, and requires the satisfaction of ultra-reliability (e.g., a packet error rate of about 10 to 5) and low latency (e.g., about 0.5 msec) conditions compared to other services. In order to satisfy such strict requirements, a transmission time interval (TTI) shorter than that of the eMBB service may need to be applied to the URLLC service. Various operation methods using the short TTI are taken into consideration.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched.

In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, technologies, such as a sensor network, machine to machine (M2M) and machine type communication (MTC), are implemented by schemes, such as beamforming, MIMO, and an array antenna, that is, 5G communication technologies. The application of a cloud radio access network (cloud RAN) as the aforementioned big data processing technology may be said to be an example of convergence between the 5G technology and the IoT technology.

As various services can be provided according to the aforementioned contents and the development of a mobile communication system, in particular, a scheme for efficiently using a non-public network (NPN) is required.

SUMMARY

A disclosed embodiment is to provide a method and apparatus capable of effectively providing a service in a wireless communication system.

A method of a session management function (SMF) entity in a communication system according to an embodiment of the disclosure for achieving the aforementioned object may include performing a packet data unit (PDU) session establishment procedure, identifying a QoS flow generated for ultra reliable low latency communication (URLLC) in a PDU session, identifying whether an indicator indicating that the PDU session is an Always-on PDU session has been transmitted to a user equipment (UE), and transmitting the indicator to the UE based on the indicator being identified as not having been transmitted to the UE.

According to an embodiment, identifying whether an indicator indicating that the PDU session is an Always-on PDU session has been transmitted to a user equipment (UE) may include identifying whether the indicator has been transmitted to the UE in the PDU session establishment procedure or a PDU session modification procedure.

According to an embodiment, the indicator may be transmitted to the UE through a PDU session modification procedure.

According to an embodiment, a user plane resource for the Always-on PDU session may be established whenever the UE transitions from a connection management (CM)-IDLE mode to a CM-CONNECTED mode.

Furthermore, a method of a terminal in a communication system according to an embodiment of the disclosure may include performing a packet data unit (PDU) session establishment procedure, identifying a QoS flow generated for ultra reliable low latency communication (URLLC) in a PDU session, and receiving, from a session management function (SMF), an indicator indicating that the PDU session is an Always-on PDU session based on the indicator not having been received from the SMF.

Furthermore, a session management function (SMF) entity in a communication system according to an embodiment of the disclosure may include a transceiver unit, and a controller configured to perform a packet data unit (PDU) session establishment procedure, identify a QoS flow generated for ultra reliable low latency communication (URLLC) in a PDU session, identify whether an indicator indicating that the PDU session is an Always-on PDU session has been transmitted to a user equipment (UE), and transmit the indicator to the UE based on the indicator being identified to not have been transmitted to the UE.

Furthermore, a terminal in a communication system according to an embodiment of the disclosure may include a transceiver unit, and a controller configured to perform a packet data unit (PDU) session establishment procedure, identify a QoS flow generated for ultra reliable low latency communication (URLLC) in a PDU session, and receive, from a session management function (SMF), an indicator indicating that the PDU session is an Always-on PDU session based on the indicator not having been received from the SMF.

A disclosed embodiment provides an apparatus and method capable of effectively providing a service in a wireless communication system.

DETAILED DESCRIPTION

Figure 1:
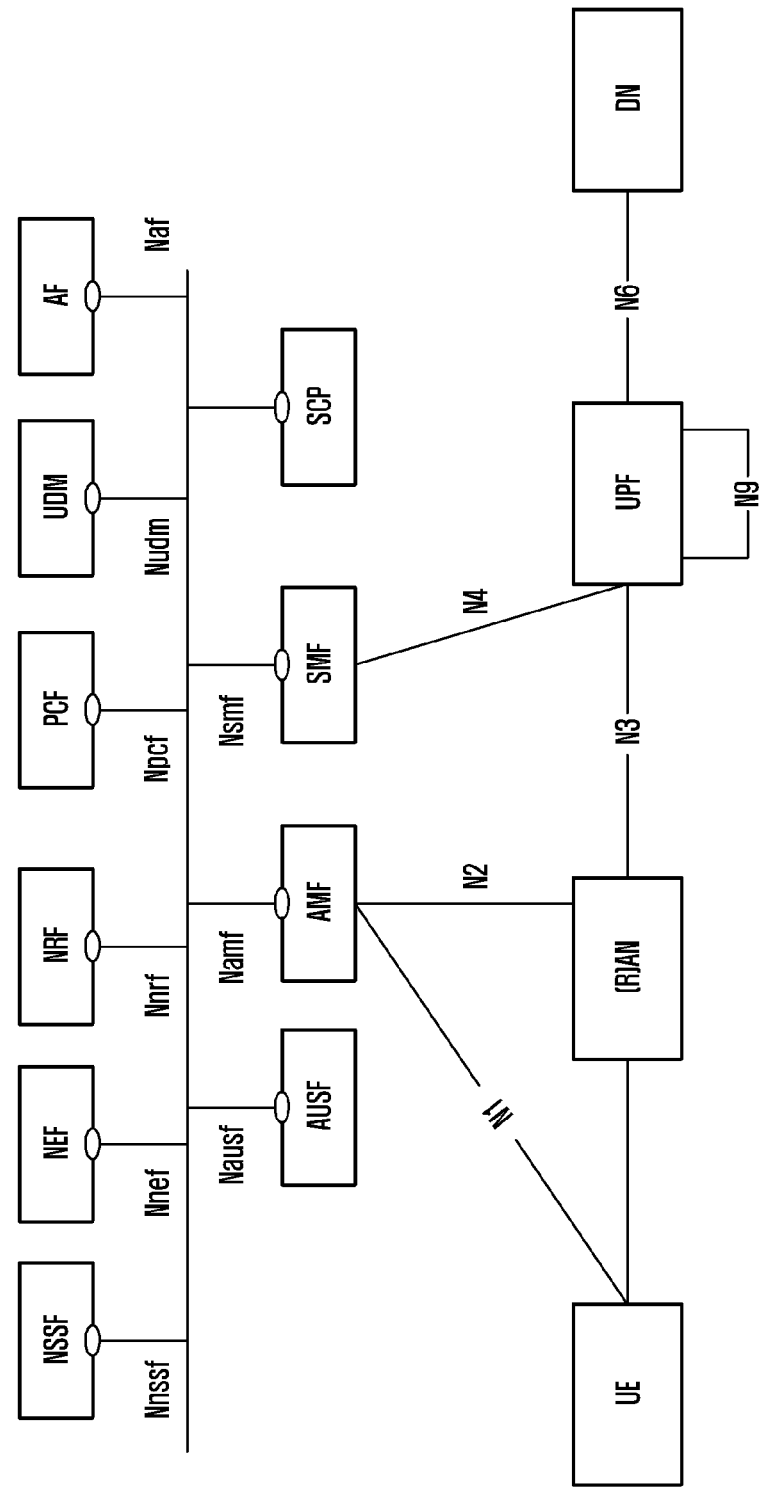
FIG. 1 is a diagram illustrating a structure of a 5G network according to an embodiment of the disclosure.

Hereinafter, preferred embodiments of the disclosure are described in detail with reference to the accompanying drawings. It is to be noted that the same reference numbers are used to refer to the same elements in the accompanying drawings. Furthermore, a detailed description of known functions or constructions that may make the subject matter of the disclosure vague will be omitted.

In this specification, in describing the embodiments, a description of technology contents that are well known in the art to which the disclosure pertains and that are not directly related to the disclosure is omitted in order to clearly transfer the subject matter of the disclosure without obscuring the subject matter of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage memory that can direct a computer or other programmable data processing equipment to implement a function in a particular manner, such that the instructions stored in the a computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application specific integrated circuit (ASIC), and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card.

Hereinafter, a base station is the subject of resource assignment to a terminal, and may be at least one of a Node B, a base station (BS), an eNode B (eNB), a gNode B (gNB), a wireless access unit, a base station controller, or a node in a network. The terminal may include a user equipment (UE), a mobile station (MS), a cellular phone, a smartphone, a computer, or a multimedia system capable of performing a communication function. Furthermore, an embodiment of the disclosure may also be applied to other communication system having a technical background or channel form similar to an embodiment of the disclosure hereinafter described. Furthermore, an embodiment of the disclosure may also be applied to other communication system through some modifications in a range not greatly departing from the scope of the disclosure based on a decision of a person having skilled technical knowledge.

A term for identifying an access node, terms to denote network entities or network functions (NFs), terms to denote messages, a term to denote an interface between network entities, terms to denote various types of identification information, etc., which are used in the following description, have been exemplified for convenience of description. Accordingly, the disclosure is not limited to terms described later, and another term to denote a target having an equivalent technical meaning may be used.

Hereinafter, for convenience of description, some of terms and names defined in the 3rd generation partnership project long term evolution (3GPP LTE) standard may be used. However, the disclosure is not restricted by the terms and names, and may also be identically applied to systems that follow other standards.

Embodiments of the disclosure provide a method capable of modifying, as an Always-on PDU Session, a PDU Session configured for an ultra reliable and low latency communication (URLLC) service or modifying the Always-on PDU Session as the PDU Session based on the presence or absence of the URLLC service.

FIG. 1 is a diagram illustrating a structure of a 5G network according to an embodiment of the disclosure. Network entities or network nodes constituting a 5G network are described as follows.

A (radio) access network ((R)AN)) is the subject that performs the assignment of a radio resource to a terminal, and may be at least one of an eNode B, a Node B, a base station (BS), a NextGeneration radio access network (NG-RAN), a 5G-AN, a wireless access unit, a base station controller, or a node in a network. The terminal may include a user equipment (UE), a NextGeneration UE (NG UE), a mobile station (MS), a cellular phone, a smartphone, a computer, or a multimedia system capable of performing a communication function. Furthermore, hereinafter, an embodiment of the disclosure is described as an example of a 5G system, but an embodiment of the disclosure may also be applied to other communication system having a similar technical background. Furthermore, an embodiment of the disclosure may also be applied to other communication system through some modifications in a range not greatly departing from the scope of the disclosure based on a decision of a person having skilled technical knowledge.

As the 4G system evolves into the 5G system, a wireless communication system defines a NextGen core (NG core), that is, a new core network, or a 5G core network (5GC). The new core network has produced all the existing network entities (NEs) as a network function (NF) by virtualizing the network entities. According to an embodiment of the disclosure, the network function may mean a network entity, a network component, or a network resource.

According to an embodiment of the disclosure, the 5GC may include NFs illustrated in FIG. 1. The disclosure is not limited to the example of FIG. 1, and the 5GC may include a larger number or smaller number of NFs than the NFs illustrated in FIG. 1.

According to an embodiment of the disclosure, an access and mobility management function (AMF) may be a network function for managing the mobility of a UE.

According to an embodiment of the disclosure, a session management function (SMF) may be a network function for managing a packet data network (PDN) connection that is provided to a UE. The PDN connection may be denoted as the name of a protocol data unit (PDU) session.

According to an embodiment of the disclosure, a policy control function (PCF) may be a network function that applies, to a UE, a service policy, billing policy, and policy for a PDU Session, of a mobile communication operator.

According to an embodiment of the disclosure, unified data management (UDM) may be a network function that stores information on a subscriber.

According to an embodiment of the disclosure, a network exposure function (NEF) may be a function that provides information about a UE to a server outside a 5G network. Furthermore, the NEF may provide a function for storing, in a UDR, information necessary for a service in a 5G network by providing the information.

According to an embodiment of the disclosure, a user plane function (UPF) may be a function for performing the role of a gateway that transfers user data (PDU) to a data network (DN).

According to an embodiment of the disclosure, a network repository function (NRF) may perform a function for discovering an NF.

According to an embodiment of the disclosure, an authentication server function (AUSF) may perform UE authentication in a 3GPP access network and a non-3GPP access network.

According to an embodiment of the disclosure, a network slice selection function (NSSF) may perform a function for selecting a network slice instance provided to a UE.

According to an embodiment of the disclosure, a data network (DN) may be a data network over which a UE transmits and receives data in order to use a service of a network operator or a 3rd party service.

Figure 2A:
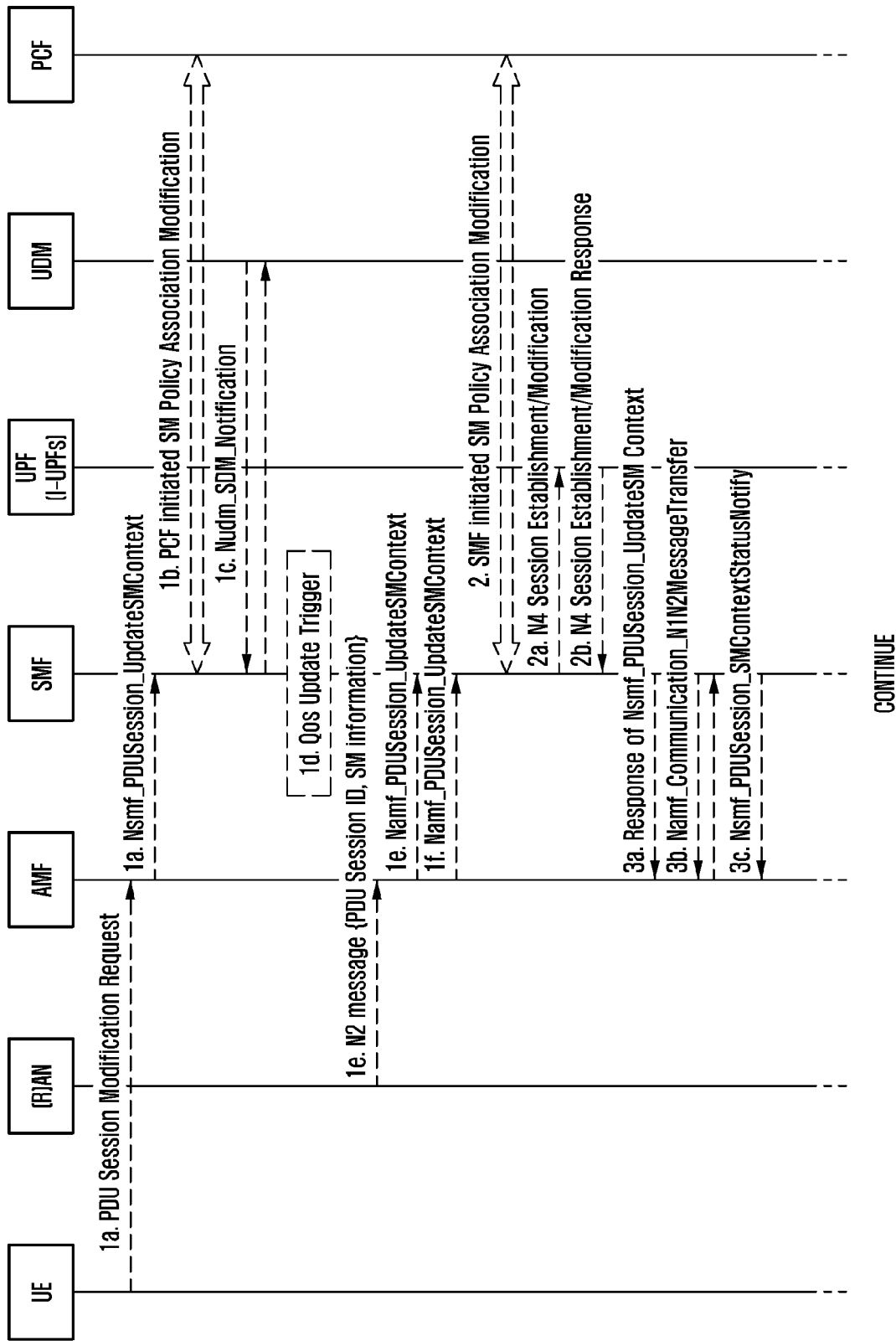
FIGS. 2AA to 2AB are diagrams illustrating a PDU Session Modification procedure according to an embodiment of the disclosure.
Figure 2A:
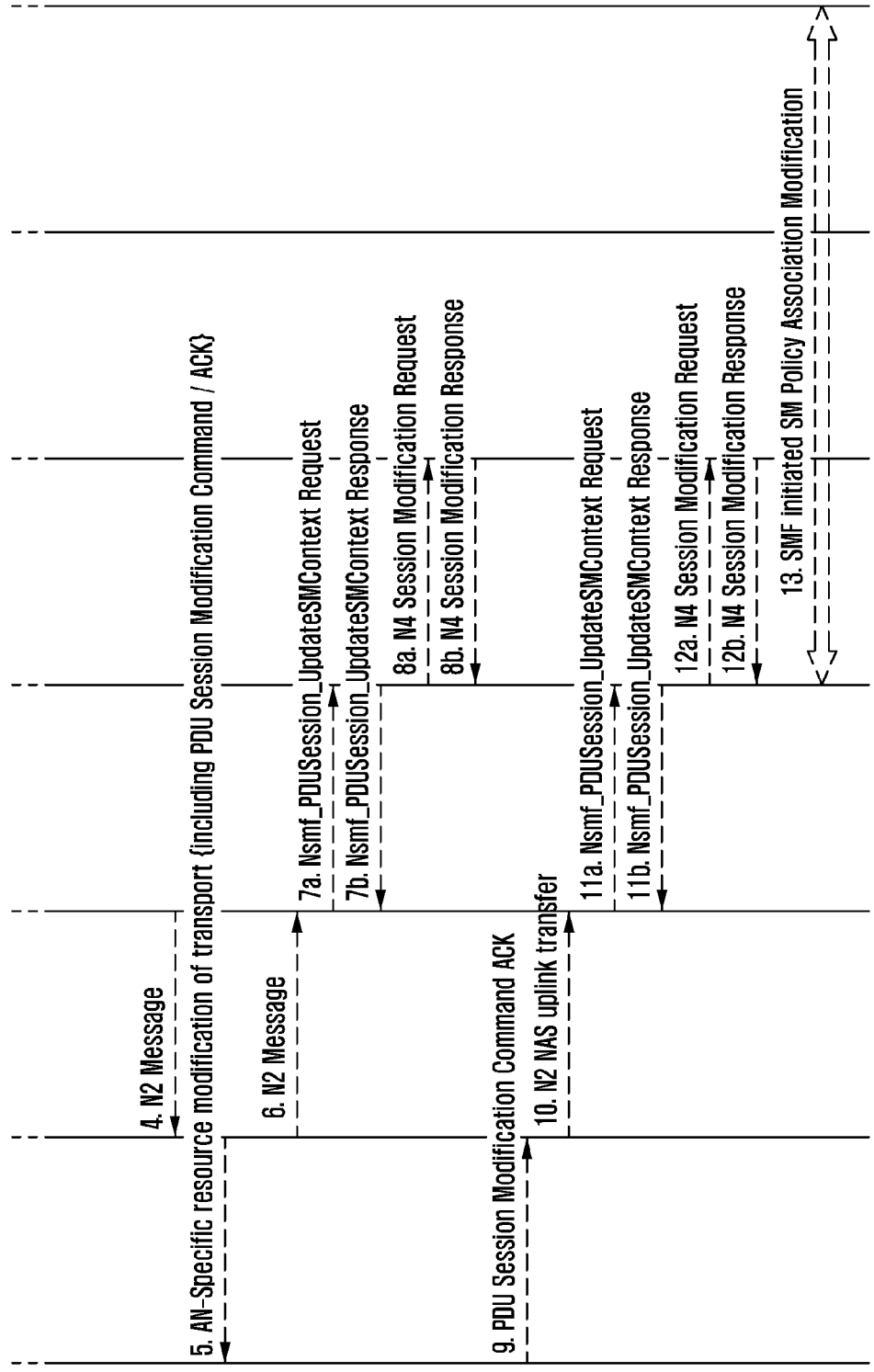

FIGS. 2AA to 2AB are diagrams illustrating a PDU Session Modification procedure according to an embodiment of the disclosure.

Steps 1a to 1f illustrate events performed by a UE, a base station or network functions in a PDU Session Modification procedure. In step 1a, the UE may start the modification of a PDU Session by transferring a PDU Session Modification Request message to the SMF via the AMF. The PDU Session Modification Request message may include parameters, such as a PDU Session ID, Packet Filters, Operation, Requested QoS, Segregation, 5GSM Core Network Capability, Number Of Packet Filters, [Always-on PDU Session Requested indication], [Always-on PDU Session Release Requested indication], etc.

In order to request QoS handling for a specific service data flow (SDF), the UE may include, in the PDU Session Modification Request message, Operation related to Packet Filters capable of specifying an SDF, Requested QoS, and Segregation.

Furthermore, when performing the handover of a PDU Session established in an evolved packet system (EPS) from an EPS to a 5GS, the UE may include an Always-on PDU Session Requested indication in the PDU Session Modification Request message in order to modify the PDU Session as an Always-on PDU Session. Furthermore, when a new URLLC service is started and a URLLC QoS Flow is transmitted by using the existing PDU Session, the UE may include Always-on PDU Session Requested indication in the PDU Session Modification Request message in order to modify the existing PDU Session as an Always-on PDU Session. On the contrary, when a corresponding PDU Session no longer needs to be maintained as an Always-on PDU Session because a service using the existing URLLC QoS Flow is terminated with respect to a specific PDU Session, the UE may include Always-on PDU Session Release Requested indication in the PDU Session Modification Request message. When modifying the Always-on PDU Session as the PDU Session, the UE may identify whether the corresponding PDU Session has been established as the Always-on PDU Session for another reason in addition to reliable transmission. If the corresponding PDU Session has been established as the Always-on PDU Session for another reason, the SMF may not modify the Always-on PDU Session as the PDU Session. Hereinafter, in this specification, a "PDU Session" may be interpreted as meaning a common PDU Session not an Always-on PDU Session, but may be interpreted as a meaning including both an Always-on PDU Session and a PDU Session not an Always-on PDU Session depending on context.

Meanwhile, the UE may be in a connection management-IDLE (CM-IDLE) or connection management-CONNECTED (CM-CONNECTED) state based on the presence or absence of a NAS Signaling Connection (N1 connection) with the AMF. In this case, the UE needs to be in the CM-CONNECTED state in order to transmit and receive user data and control signals to and from a base station or a network.

When the UE transitions from the CM-IDLE state to the CM-CONNECTED state, a user plane (UP) connection is always activated in the case of an Always-on PDU Session. Furthermore, in general, if data is not transmitted in the PDU Session for a while, the SMF deactivates the UP connection, but does not apply the deactivation to the Always-on PDU Session. That is, in the case of the Always-on PDU Session, the UP connection is always activated while the UE is in the CM-CONNECTED state. In providing the URLLC service that is very sensitive to delay, the service may fail due to an UP connection configuration time. Accordingly, it is very important to establish, as an Always-on PDU Session, a PDU Session in which a URLLC QoS Flow is transmitted.

As a footnote for the CM-IDLE state and the CM-CONNECTED state, the UE in the CM-IDLE state does not have the NAS signaling connection (N1 connection) with the AMF. In this case, not only an AN signaling connection with an NG-RAN, but an N2 connection and N3 connection for the corresponding UE may not be present. That is, the UE in the CM-IDLE state cannot exchange user data or control signals through the uplink (UL) or downlink (DL). When user data or a control signal toward the UE occurs, a network transitions to the CM-CONNECTED state through a network triggered Service Request procedure (paging procedure). On the contrary, when user data or a control signal to be transmitted from the UE to the network occurs, the UE transitions to the CM-CONNECTED state through a Service Request procedure. In the CM-CONNECTED state, the UE has the NAS signaling connection (N1) with the AMF.

However, an UP connection for an Always-on PDU Session has always been activated although there is no data to be transmitted. Accordingly, the NG-RAN and the UPF need to always assign a resource for the Always-on PDU Session, and unwanted signaling may occur. For this reason, it is preferred to modify the Always-on PDU Session as a PDU Session when it is not necessary to use the Always-on PDU Session.

Steps 1b, 1c, and 1d illustrate a PDU Session Modification requested by the SMF. The PDU Session Modification may occur when a policy is changed by the PCF, when subscription data is changed by the UDM, or when a modification request is received by a configured policy within the SMF or from the (R)AN.

Steps 1e and 1f illustrate cases where PDU Session Modifications are requested by requests from the AN and the AMF, respectively.

In steps 2a and 2b, the SMF may determine whether to perform reliable transmission using redundant transmission with respect to a specific QoS Flow based on an authorized 5QI, an NG-RAN node capability, and operator configuration information. That is, the SMF may determine whether a specific QoS Flow is for the URLLC service. If the SMF determines that a specific QoS Flow is a QoS Flow for the URLLC service, the SMF may assign additional CN Tunnel Info and transmit the additional CN Tunnel Info to the UPF so that two GTP-U tunnels between the NG-RAN and the UPF are configured. Furthermore, in order to perform redundant transmission using the two GTP-U tunnels on a packet transmitted through a corresponding QoS Flow, the SMF instructs the UPF to perform packet duplication (in the case of DL) and packet elimination (in the case of UL). If additional CN Tunnel Info is assigned by the UPF, the UPF may assign the additional CN Tunnel Info, and may notify the SMF of the additional CN Tunnel Info.

On the contrary, the SMF may determine whether to stop reliable transmission with respect to a QoS Flow for the existing URLLC service. The SMF may determine whether to stop the reliable transmission based on an authorized 5QI, an NG-RAN node capability, and operator configuration information or may determine to stop the reliable transmission if the corresponding QoS Flow is no longer transmitted. At this time, the SMF may instruct the UPF to release additional CN Tunnel Info assigned thereto and to stop packet duplication (in the case of DL) and packet elimination (in the case of UL) operations for redundant transmission.

The SMF may configure two intermediate UPF (I-UPFs) between the NG-RAN and a PDU Session Anchor (PSA) UPF and perform redundant transmission. To this end, the SMF assigns the two I-UPFs, transmits UL CN Tunnel Info of the two I-UPFs to the PSA UPF, and transmits DL CN Tunnel Info of the PSA UPF to the I-UPF. A PSA UPF request for the redundant transmission and redundant transmission release are the same as those described above.

In step 3a, when the UE or the AN requests a Modification, the SMF may perform a response to the request through N2 SM information (AN) encapsulated in an Nsmf_P-DUSession_UpdateSMContext Response message or a PDU Session Modification Command (UE) message.

The PDU Session Modification Command message may include parameters, such as a PDU Session ID, a QoS rule(s), a QoS rule operation, a QoS Flow level, QoS parameters, Session-AMBR, [Always-on PDU Session Granted indication], and [Always-on PDU Session Release Granted indication].

The Always-on PDU Session Granted indication is a parameter that is transmitted by the SMF as a response when the UE requests to modify a specific PDU Session as an Always-on PDU Session. Alternatively, although the UE has not transmitted the Always-on PDU Session Request indication (i.e., although the UE has not requested to modify a specific PDU Session as an Always-on PDU Session), if the SMF has determined to perform reliable transmission with respect to a specific QoS Flow in step 2a, the SMF may notify the UE that the corresponding PDU Session has been modified as the Always-on PDU Session by including the Always-on PDU Session Granted indication in a PDU Session Modification Command message. The reason for this is that the UE has to request UP connection activation for the corresponding PDU Session when the UE transitions from the CM-IDLE state to the CM-CONNECTED state. That is, the UE that has received the Always-on PDU Session Granted indication may include the ID of the corresponding PDU Session in a List Of PDU Sessions To Be Activated parameter in a procedure, such as Registration or a Service Request.

The Always-on PDU Session Release Granted indication is a parameter that is transmitted by the SMF as a response when the UE requests that an Always-on PDU Session is modified as a PDU Session. Alternatively, although the UE has not transmitted the Always-on PDU Session Release Requested indication (i.e., although the UE has not requested that the Always-on PDU Session is modified as the PDU Session), if the SMF has determined to stop reliable transmission with respect to a specific QoS Flow in step 2a, the SMF may notify the UE that the Always-on PDU Session has been modified as the PDU Session by including the Always-on PDU Session Release Granted indication in the PDU Session Modification Command message. The reason for this is that the UE needs to be notified that the Always-on PDU Session has been modified as the PDU Session in order to stop a request for UP connection activation for the corresponding PDU Session because the UE will request the UP connection activation if the corresponding PDU Session has been still configured as the Always-on PDU Session when the UE transitions from the CM-IDLE state to the CM-CONNECTED state. That is, the UE that has received the Always-on PDU Session Release Granted indication may stop including the ID of the corresponding PDU Session in the List Of PDU Sessions To Be Activated parameter in a procedure, such as Registration or a Service Request. When modifying an Always-on PDU Session as a PDU Session without a request from the UE, the SMF may identify whether the corresponding PDU Session has been established as the Always-on PDU Session for another reason in addition to reliable transmission. If the corresponding PDU Session has been established as the Always-on PDU Session for another reason, the SMF may not modify the Always-on PDU Session as the PDU Session.

If the SMF has determined to perform reliable transmission in step 2a, CN Tunnel Info for an additional tunnel may be included in N2 SM information. Furthermore, the SMF instructs the NG-RAN to perform packet duplication (in the case of UL) and packet elimination (in the case of DL) for redundant transmission using two GTP-U tunnels with respect to a packet transmitted through a corresponding QoS Flow.

On the contrary, the SMF may determine whether to stop reliable transmission with respect to a QoS Flow for the existing URLLC service. The SMF may determine whether to stop the reliable transmission based on an authorized 5QI, a NG-RAN node capability, and operator configuration information or may determine to stop the reliable transmission if the corresponding QoS Flow is no longer transmitted. At this time, the SMF may instruct the NG-RAN to release additional AN Tunnel Info and to stop packet duplication (in the case of UL) and packet elimination (in the case of DL) operations for redundant transmission.

When requesting a Modification in step 3b, the SMF transfers modified contents according to the Modification through the N2 SM information (AN) encapsulated in a Namf_Communication_N1N2MessageTransfer message or a PDU Session Modification Command (UE) message.

The PDU Session Modification Command message may include parameters, such as a PDU Session ID, a QoS rule(s), a QoS rule operation, a QoS Flow level, QoS parameters, a Session-AMBR, [Always-on PDU Session Granted indication], and [Always-on PDU Session Release Granted indication].

The Always-on PDU Session Granted indication is a parameter that is transmitted from the SMF to the UE if the SMF determines to perform reliable transmission with respect to a specific QoS Flow in step 2a. In this case, the SMF may notify the UE that a corresponding PDU Session has been modified as the Always-on PDU Session by including the Always-on PDU Session Granted indication in the PDU Session Modification Command message. The reason for this is that the UE has to request UP connection activation for the corresponding PDU Session when the UE transitions from the CM-IDLE state to the CM-CONNECTED state. That is, the UE that has received the Always-on PDU Session Granted indication may include the ID of the corresponding PDU Session in the List Of PDU Sessions To Be Activated parameter in a procedure, such as Registration or a Service Request.

The Always-on PDU Session Release Granted indication is a parameter that is transmitted from the SMF to the UE if the SMF has determined to stop the reliable transmission with respect to a specific QoS Flow in step 2*a*. In this case, the SMF may notify the UE that the Always-on PDU Session has been modified as the PDU Session by including the Always-on PDU Session Release Granted indication in the PDU Session Modification Command message. The reason for this is that the UE needs to be notified that the Always-on PDU Session has been modified as the PDU Session in order to stop a request for UP connection activation for the corresponding PDU Session because the UE will request the UP connection activation if the corresponding PDU Session has been still configured as the Always-on PDU Session when the UE transitions from the CM-IDLE state to the CM-CONNECTED state. That is, the UE that has received the Always-on PDU Session Release Granted indication may stop including the ID of the corresponding PDU Session in the List Of PDU Sessions To Be Activated parameter in a procedure, such as Registration or a Service Request. When modifying an Always-on PDU Session as a PDU Session without a request from the UE, the SMF may identify whether the corresponding PDU Session has been established as the Always-on PDU Session for another reason in addition to the reliable transmission. If the corresponding PDU Session has been established as the Always-on PDU Session for another reason, the SMF may not modify the Always-on PDU Session as the PDU Session.

If the SMF has determined to perform the reliable transmission in step 2*a*, CN Tunnel Info for an additional tunnel may be included in the N2 SM information. Furthermore, the SMF instructs the NG-RAN to perform packet duplication (in the case of UL) and packet elimination (in the case of DL) for the redundant transmission using two GTP-U tunnels with respect to a packet transmitted through a corresponding QoS Flow.

On the contrary, the SMF may determine whether to stop the reliable transmission with respect to a QoS Flow for the existing URLLC service. The SMF may determine whether to stop the reliable transmission based on an authorized 5QI, a NG-RAN node capability, and operator configuration information or may determine to stop the reliable transmission if the corresponding QoS Flow is no longer transmitted. At this time, the SMF may instruct the NG-RAN to release additional AN Tunnel Info and stop packet duplication (in the case of UL) and packet elimination (in the case of DL) operations for the redundant transmission.

If the SMF has requested a Modification because of the update of an SMF-related parameter from the UDM in step 3*c*, the SMF may transmit related information to the AMF.

Through steps 4 and 5, N1 SM container which encapsulates the N2 SM information and the PDU Session Modification Command may be transmitted to the NG-RAN and the UE.

In step 6, the NG-RAN may assign additional AN Tunnel Info for the reliable transmission, and may transmit the additional AN Tunnel Info to the AMF through the N2 SM information (in step 2*a*, if the SMF has determined to perform the reliable transmission).

In steps 7*a* and 7*b*, the AMF may transfer the N2 SM information to the SMF.

In steps 8*a* and 8*b*, the SMF may transfer, to the UPF or I-UPF, the additional AN Tunnel Info received from the NG-RAN for the reliable transmission. If CN Tunnel Info of the I-UPF has been assigned in the UPF in step 2*b*, the SMF may transfer DL CN Tunnel Info of two I-UPFs to the PSA UPF.

In steps 9 to 11*b*, the UE may transmit acknowledgment for the PDU Session Modification Command message. The NG-RAN and the AMF may transfer the PDU Session Modification Command message to the SMF.

In step 12, the SMF may update an N4 Session with the UPF.

In step 13, the SMF may notify the PCF of a result about whether a PCC decision has been incorporated.

Figure 2B:
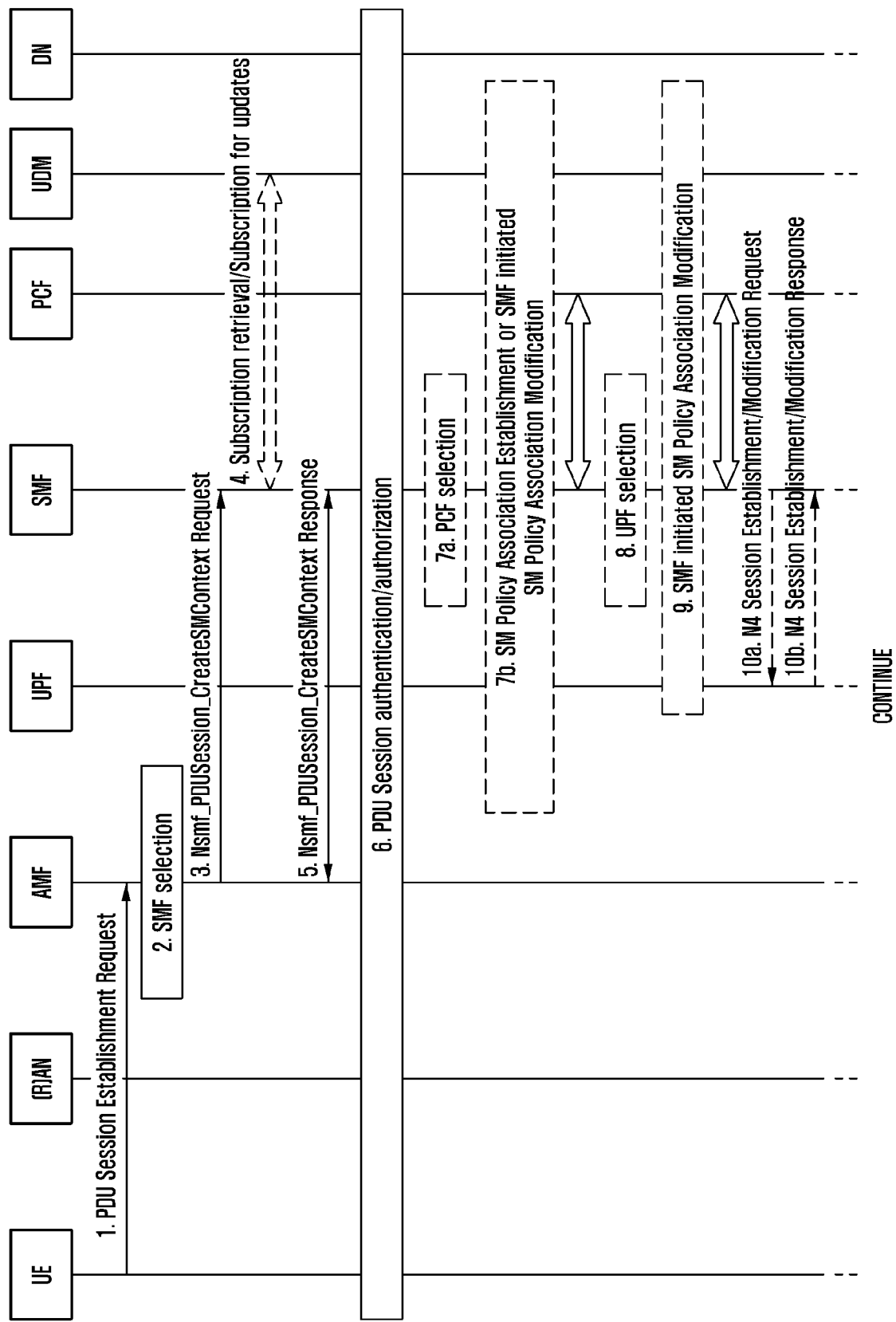
FIGS. 2BA to 2BB are diagrams illustrating a PDU Session Establishment procedure according to an embodiment of the disclosure.
Figure 2B:
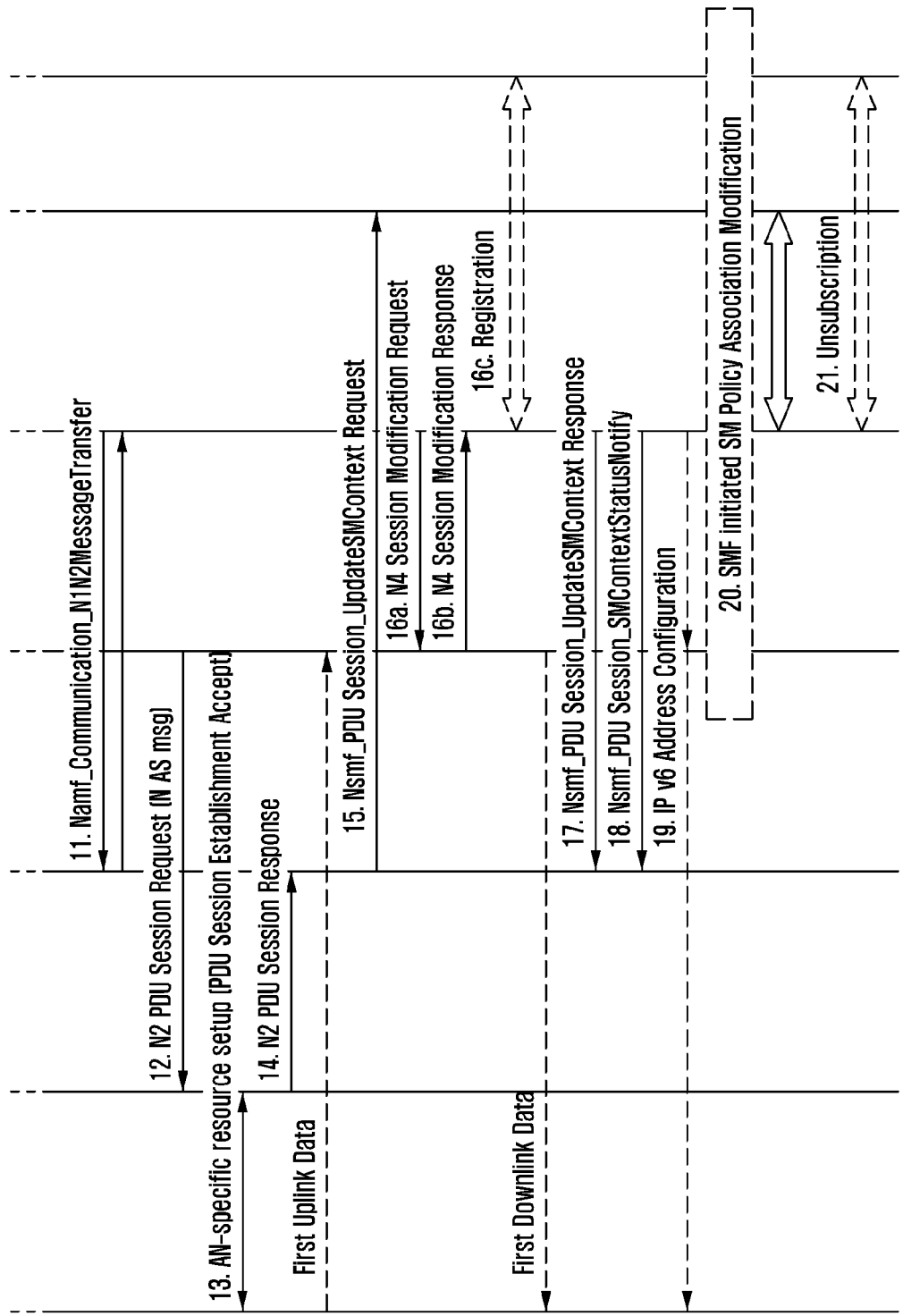

FIGS. 2BA to 2BB are diagrams illustrating a PDU Session Establishment procedure according to an embodiment of the disclosure.

In step 1, a UE may encapsulate a PDU Session Establishment Request message in an NAS Message and transfer the PDU Session Establishment Request message to the SMF via the AMF in order to establish a PDU Session. If the UE attempts to establish the PDU Session that supports a URLLC QoS Flow, the UE may request Always-on PDU Session establishment by including Always-on PDU Session Requested indication in the PDU Session Establishment Request message.

In step 11, the SMF may transmit, to the AMF, a PDU Session Establishment Accept message to be transmitted to the UE by encapsulating the PDU Session Establishment Accept message in a Namf_Communication_N1N2MessageTransfer message. If the UE requests the Always-on PDU Session Establishment by including Always-on the PDU Session Requested indication in the PDU Session Establishment Request message, the SMF may respond to the request through the PDU Session Establishment Accept message. If the SMF permits the Establishment, the SMF may include Always-on PDU Session Granted indication in the PDU Session Establishment Accept message. Alternatively, although the UE does not transmit Always-on PDU Session Request indication through the PDU Session Establishment Request message, if the SMF has determined that an Always-on PDU Session is required, the SMF may include the Always-on PDU Session Granted indication in the PDU Session Establishment Accept message. If the SMF has determined to perform reliable transmission with respect to specific QoS Flows in step 10*a*, the SMF may include the Always-on PDU Session Granted indication in the PDU Session Establishment Accept message. Accordingly, the UE may be notified that a corresponding PDU Session has been established as an Always-on PDU Session. The reason for this is that the UE has to request UP connection activation for a corresponding PDU Session when the UE transitions from the CM-IDLE state to the CM-CONNECTED state. That is, the UE that has received the Always-on PDU Session Granted indication may include the ID of the corresponding PDU Session in a List Of PDU Sessions To Be Activated parameter in a procedure, such as Registration or a Service Request.

Figure 3:
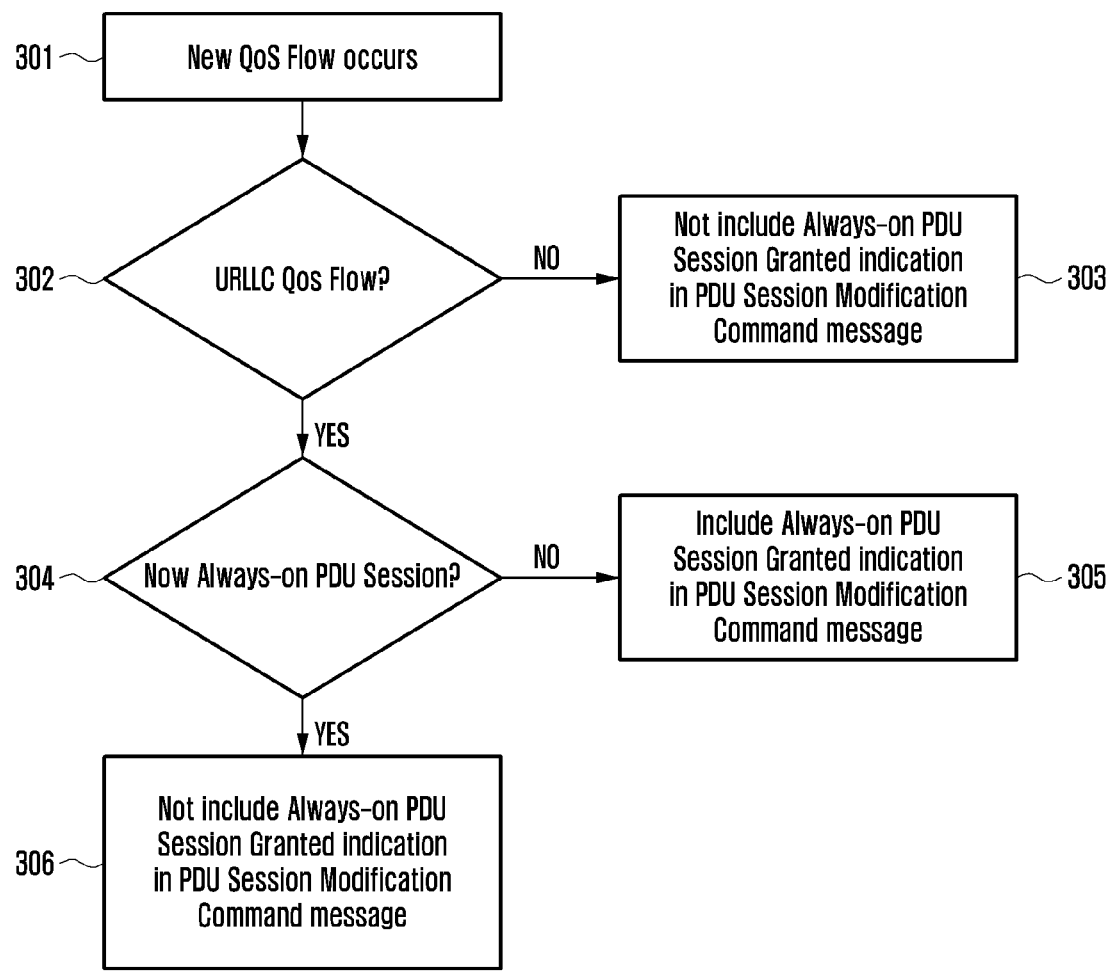
FIG. 3 is a diagram illustrating an operation of a SMF when a new QoS flow occurs according to an embodiment of the disclosure.

FIG. 3 is a diagram illustrating an operation of the SMF when a new QoS Flow occurs according to an embodiment of the disclosure. Hereinafter, as an example, each of steps disclosed in FIG. 3 will be described as being autonomously performed by the SMF. Each step may be implemented according to any embodiment which may be implemented by a person having ordinary knowledge in the art to which the disclosure pertains without limiting the scope of the disclosure, and may be performed by any component included in a way to be capable of performing each step in response to a request from the SMF, for example.

In step 301, the SMF may determine whether a new QoS Flow is a URLLC service when the QoS Flow occurs.

In step 302, the SMF may determine whether the existing QoS Flow related to a PDU Session for a corresponding QoS Flow in addition to the new QoS Flow in step 301 is a service for a URLLC service through information, such as an authorized 5QI, a NG-RAN node capability, and an operator configuration. Furthermore, the SMF may determine whether to perform reliable transmission based on a result of the determination. That is, the SMF may determine to perform the reliable transmission if the new QoS Flow or the existing QoS Flow is a service for the URLLC service, and may determine to not perform the reliable transmission if the new QoS Flow or the existing QoS Flow is not a service for the URLLC service.

If the SMF has determined to not perform the reliable transmission in step 302, in step 303, the SMF may not include Always-on PDU Session Granted indication in a PDU Session Modification Command message.

If the SMF has determined to perform the reliable transmission in step 302, in step 304, the SMF may determine whether a PDU Session in which a corresponding QoS Flow is now transmitted is an Always-on PDU Session. For example, the SMF may determine whether a PDU Session in which a corresponding QoS Flow is now transmitted is an Always-on PDU Session based on whether Always-on PDU Session Granted indication has been transferred to a UE through a previously performed PDU Session Establishment procedure or PDU Session Modification procedure. That is, if Always-on PDU Session Granted indication has not been transferred to the UE through a previously performed PDU Session Establishment procedure or PDU Session Modification procedure, the SMF may determine that the PDU Session in which the corresponding QoS Flow is now transmitted is not an Always-on PDU Session.

If it is determined that the PDU Session in which the corresponding QoS Flow is now transmitted is not an Always-on PDU Session in step 304, in step 305, the SMF may include Always-on PDU Session Granted indication in the PDU Session Modification Command message. The SMF may notify the UE that the corresponding PDU Session has been modified as an Always-on PDU Session through an Always-on PDU Session Granted indication parameter. The reason for this is that the UE has to request UP connection activation for the corresponding PDU Session when the UE transitions from the CM-IDLE state to the CM-CONNECTED state. That is, the UE that has received the Always-on PDU Session Granted indication may include the ID of the corresponding PDU Session in a List Of PDU Sessions To Be Activated parameter in a procedure, such as Registration or a Service Request.

If it is determined that the PDU Session in which the corresponding QoS Flow is now transmitted is an Always-on PDU Session in step 304, in step 306, the SMF may not include Always-on PDU Session Granted indication in the PDU Session Modification Command message.

Figure 4:
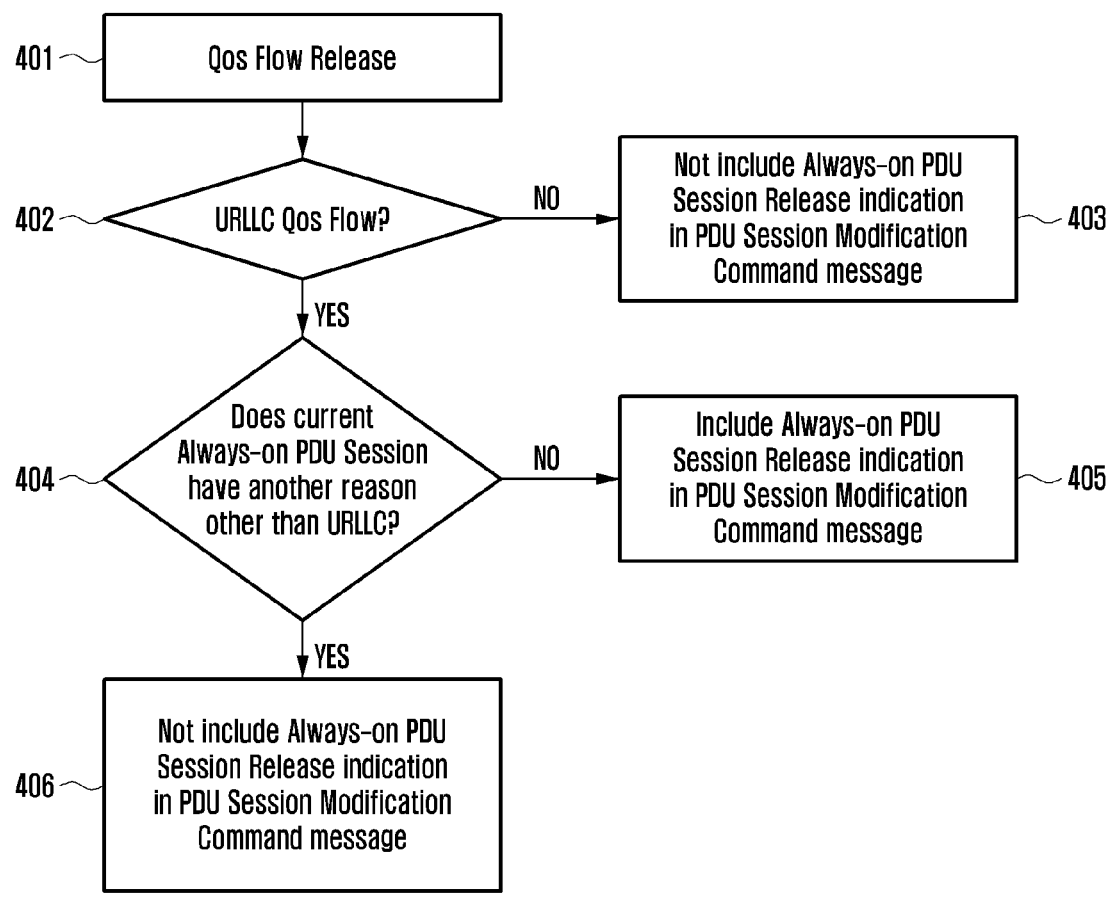
FIG. 4 is a diagram illustrating an operation of the SMF when a QoS flow is released according to an embodiment of the disclosure.

FIG. 4 is a diagram illustrating an operation of the SMF when a QoS Flow is released according to an embodiment of the disclosure. Hereinafter, as an example, each of steps disclosed in FIG. 4 will be described as being autonomously performed by the SMF. Each step may be implemented according to any embodiment which may be implemented by a person having ordinary knowledge in the art to which the disclosure pertains without limiting the scope of the disclosure, and may be performed by any component included in a way to be capable of performing each step in response to a request from the SMF, for example.

In step 401, the SMF may determine whether a QoS Flow is for a URLLC service when the corresponding QoS Flow is released.

In step 402, the SMF may determine whether the QoS Flow released in step 401 is for the URLLC service and whether the existing QoS Flow related to a PDU Session for the corresponding QoS Flow no longer supports the URLLC service through information, such as an authorized 5QI, a NG-RAN node capability, and a operator configuration. Furthermore, the SMF may determine whether to perform reliable transmission based on a result of the determination. That is, the SMF may determine to not perform the reliable transmission if the released QoS Flow or the existing QoS Flow no longer supports the URLLC service, and may determine to perform the reliable transmission if the released QoS Flow or the existing QoS Flow supports at least one URLLC service.

If the QoS Flow released in step 402 is not a QoS Flow for the URLLC service or if there is no change about whether the existing QoS Flow supports the URLLC service, that is, if at least one QoS Flow still supports the URLLC service, in step 403, the SMF may not include Always-on PDU Session Release Granted indication in a PDU Session Modification Command message.

If the QoS Flow released in step 402 was a QoS Flow for the URLLC service or the existing QoS Flow does not support the URLLC service, that is, if any QoS Flow does not support the URLLC service, in step 404, the SMF may determine whether a current PDU Session has been established as an Always-on PDU Session for another reason other than the URLLC service.

If the current PDU Session has not been established as the Always-on PDU Session for another reason other than the URLLC service in step 404, in step 405, the SMF may include Always-on PDU Session Release Granted indication in a PDU Session Modification Command message. The SMF may notify the UE that the Always-on PDU Session has been modified as the PDU Session through the Always-on PDU Session Release Granted indication parameter. The reason for this is that the UE needs to be notified that the Always-on PDU Session has been modified as the PDU Session in order to stop a request for UP connection activation for the corresponding PDU Session because the UE will request the UP connection activation if the corresponding PDU Session has been still configured as the Always-on PDU Session when the UE transitions from the CM-IDLE state to the CM-CONNECTED state. That is, the UE that has received the Always-on PDU Session Release Granted indication may stop including the ID of the corresponding PDU Session in a List Of PDU Sessions To Be Activated parameter in a procedure, such as Registration or a Service Request.

If the current PDU Session has not been established as the Always-on PDU Session for another reason other than the URLLC service in step 404, in step 406, the SMF may not include Always-on PDU Session Release Granted indication in a PDU Session Modification Command message.

Figure 5:
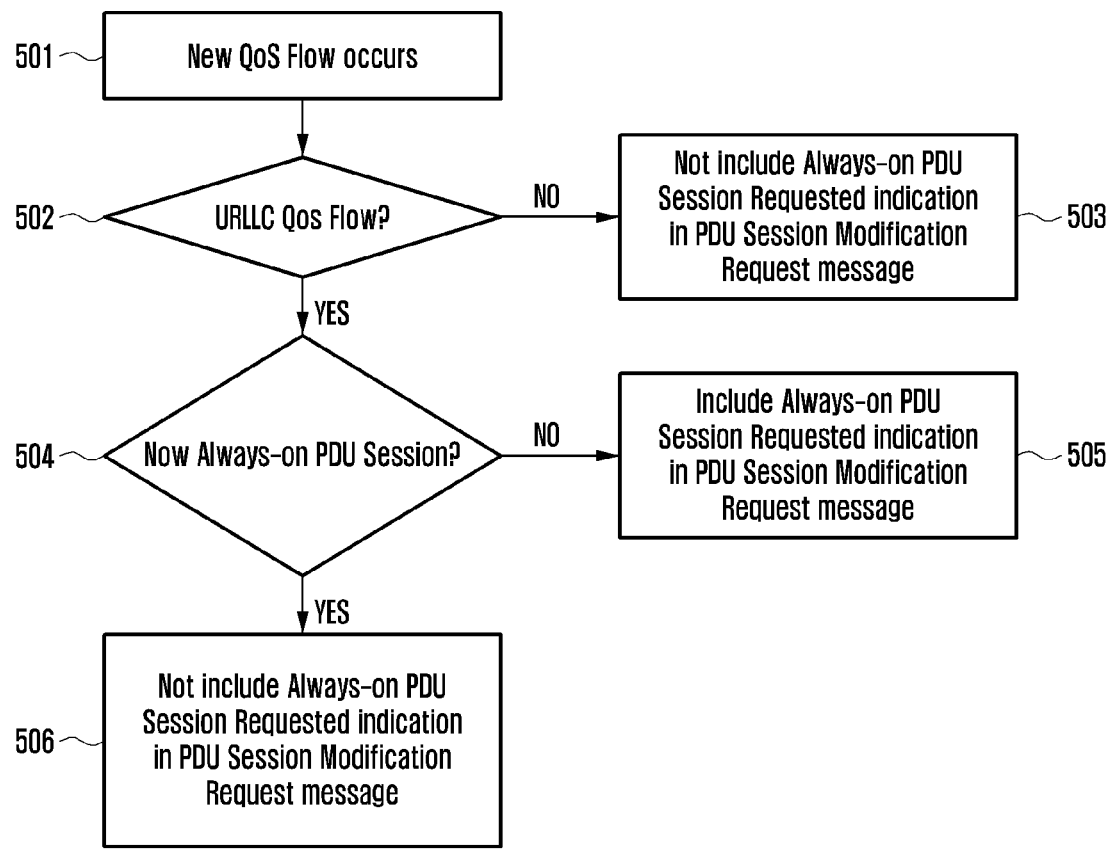
FIG. 5 is a diagram illustrating an operation of a UE when a new QoS flow occurs according to an embodiment of the disclosure.

FIG. 5 is a diagram illustrating an operation of a UE when a new QoS Flow occurs according to an embodiment of the disclosure. Hereinafter, as an example, each of steps disclosed in FIG. 5 will be described as being autonomously performed by the UE. Each step may be implemented according to any embodiment which may be implemented by a person having ordinary knowledge in the art to which the disclosure pertains without limiting the scope of the disclosure, and may be performed by any component included in a way to be capable of performing each step in response to a request from the UE, for example.

In step 501, the UE may determine whether a new QoS Flow is for a URLLC service when the QoS Flow occurs.

In step 502, the UE may determine whether the new QoS Flow in step 501 and the existing QoS Flow are a service for the URLLC service based on information received from a higher layer.

If it is determined that the new QoS Flow in step 502 and the existing QoS Flow are not QoS Flows for the URLLC service, in step 503, the UE may not include Always-on PDU Session Requested indication in a PDU Session Modification Request message.

If it is determined that the new QoS Flow in step 502 and the existing QoS Flow are QoS Flows for the URLLC service in step 504, the UE may determine whether a PDU Session in which the corresponding QoS Flow is now transmitted is an Always-on PDU Session. For example, the UE may determine whether the PDU Session in which the corresponding QoS Flow is now transmitted is an Always-on PDU Session based on whether Always-on PDU Session Granted indication has been received from the SMF through a previously performed PDU Session Establishment procedure or PDU Session Modification procedure. That is, if Always-on PDU Session Granted indication has not been received from the SMF through a previously performed PDU Session Establishment procedure or PDU Session Modification procedure, the UE may determine that the PDU Session in which the corresponding QoS Flow is now transmitted is not an Always-on PDU Session.

If it is determined that the PDU Session in which the corresponding QoS Flow is now transmitted is not an Always-on PDU Session in step 504, in step 505, the UE may include Always-on PDU Session Requested indication in a PDU Session Modification Request message.

If it is determined that the PDU Session in which the corresponding QoS Flow is now transmitted is an Always-on PDU Session in step 504, in step 506, the UE may not include Always-on PDU Session Requested indication in a PDU Session Modification Request message.

Figure 6:
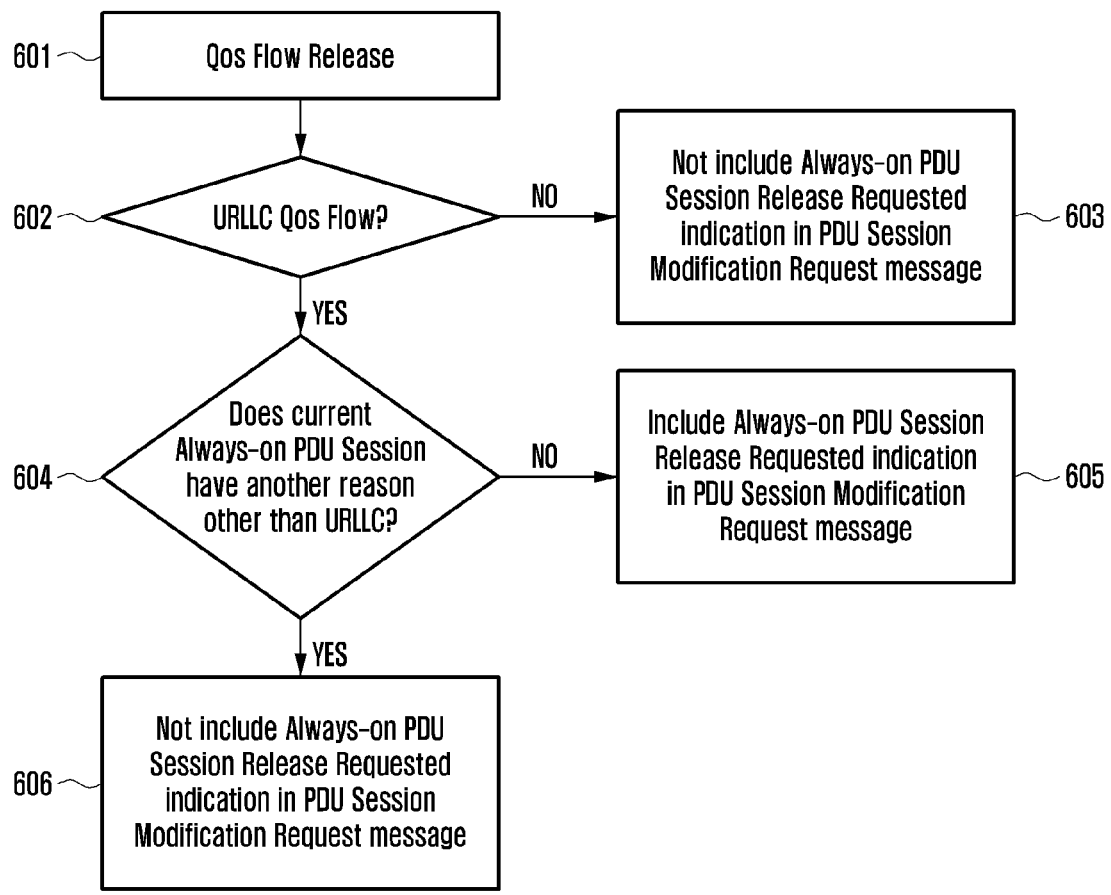
FIG. 6 is a diagram illustrating an operation of a UE when a QoS flow is released according to an embodiment of the disclosure.

FIG. 6 is a diagram illustrating an operation of a UE when a QoS Flow is released according to an embodiment of the disclosure. Hereinafter, as an example, each of steps disclosed in FIG. 6 will be described as being autonomously performed by the UE. Each step may be implemented according to any embodiment which may be implemented by a person having ordinary knowledge in the art to which the disclosure pertains without limiting the scope of the disclosure, and may be performed by any component included in a way to be capable of performing each step in response to a request from the UE, for example.

In step 601, the UE may determine whether a QoS Flow is for a URLLC service when the corresponding QoS Flow is released.

In step 602, the UE may determine whether the existing QoS Flow in addition to the QoS Flow released in step 601 no longer supports the URLLC service through information received from a higher layer.

If the QoS Flow released in step 602 is not a QoS Flow for the URLLC service or there is no change about whether the existing QoS Flow supports the URLLC service, that is, if at least one QoS Flow still supports the URLLC service, in step 603, the UE may not include Always-on PDU Session Release Requested indication in a PDU Session Modification Request message.

If the QoS Flow released in step 602 was a QoS Flow for the URLLC service or the existing QoS Flow does not support the URLLC service, that is, if any QoS Flow does not support the URLLC service, in step 604, the UE may determine whether a current PDU Session has been established as an Always-on PDU Session for another reason other than the URLLC service.

If the current PDU Session has not been established as the Always-on PDU Session for another reason other than the URLLC service in step 604, in step 605, the UE may include Always-on PDU Session Release Requested indication in a PDU Session Modification Request message.

If the current PDU Session has been established as the Always-on PDU Session for another reason other than the URLLC service in step 604, in step 606, the UE may not include Always-on PDU Session Release Requested indication in a PDU Session Modification Request message.

Figure 7:
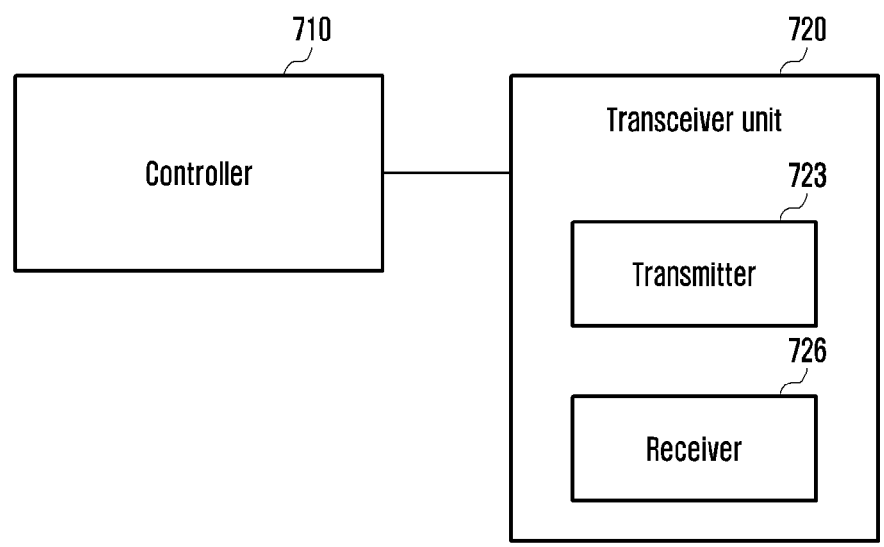
FIG. 7 is a diagram illustrating a structure of a terminal according to an embodiment of the disclosure.

FIG. 7 is a diagram illustrating a structure of a UE according to an embodiment of the disclosure.

The UE according to an embodiment of the disclosure may include a transceiver unit 720 and a controller 710 controlling an overall operation of the UE. Furthermore, the transceiver unit 720 may include a transmitter 723 and a receiver 726.

The transceiver unit 720 may transmit and receive signals to and from a base station or network entities.

The controller 710 may control the UE to perform any one operation among the aforementioned embodiments. Meanwhile, the controller 710 and the transceiver unit 720 do not need to be essentially embodied as separate modules, and may be embodied as one component in a form, such as a single chip. Furthermore, the controller 710 and the transceiver unit 720 may be electrically connected. Furthermore, for example, the controller 710 may be a circuit, an application-specific circuit, or at least one processor. Furthermore, operations of the UE may be realized by including, in any component within the UE, a memory device in which a corresponding program code has been stored.

Figure 8:
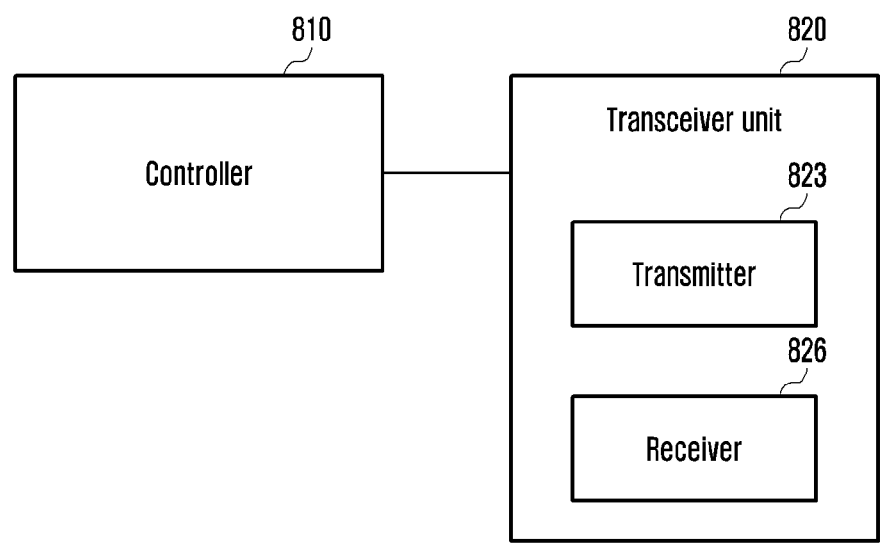
FIG. 8 is a diagram illustrating a structure of a network entity apparatus according to an embodiment of the disclosure.

FIG. 8 is a diagram illustrating a structure of a network entity according to an embodiment of the disclosure.

The network entity according to an embodiment of the disclosure may include a transceiver unit 820 and a controller 810 controlling an overall operation of the network entity. Furthermore, the transceiver unit 820 may include a transmitter 823 and a receiver 826.

The transceiver unit 820 may transmit and receive signals to and from other network entities.

The controller 810 may control the network entity to perform any one operation among the aforementioned embodiments. Meanwhile, the controller 810 and the transceiver unit 820 do not need to be essentially embodied as separate modules, and may be embodied as one component in a form, such as a single chip. Furthermore, the controller 810 and the transceiver unit 820 may be electrically connected. Furthermore, for example, the controller 810 may be a circuit, an application-specific circuit, or at least one processor. Furthermore, operations of the network entity may be realized by including, in any component within the network entity, a memory device in which a corresponding program code has been stored.

It is to be noted that the construction diagrams, the exemplary diagrams of the methods of transmitting a control/data signal, and the exemplary diagrams and construction diagrams of the operation procedures illustrated in FIGS. 7 to 8 are not intended to limit the scope of a right of the disclosure. That is, all the components, entities, or steps of operations illustrated in the drawings should not be construed as being essential components for an implementation of the disclosure, and may be embodied within a range that does not undermine the essence of the disclosure although only some components are included.

The aforementioned operations of the network entity, the base station, or the terminal may be realized by including, in any component within the network entity, base station or terminal apparatus, a memory device in which a corresponding program code has been stored. That is, the controller of the network entity, the base station, or the terminal apparatus may execute the aforementioned operations by reading and executing a program code stored within a memory device by a processor or a central processing unit (CPU).

Methods according to embodiments written in the claims or specification of the disclosure may be implemented in the form of hardware, software, or a combination of hardware and software.

If a method is implemented as software, a computer-readable storage medium storing one or more programs (software module) may be provided. The one or more programs stored in the computer-readable storage medium are configured for being executable by one or more processors within an electronic device. The one or more programs include instructions that enable the electronic device to execute methods according to embodiments, which are written in the claims or specification of the disclosure.

Such a program (software module or software) may be stored in a random access memory, a non-volatile memory including a flash memory, a read-only memory (ROM), an electrically erasable programmable read-only memory (EEPROM), a magnetic disc storage device, a compact disc-ROM (CD-ROM), digital versatile discs (DVDs) or other types of optical storage devices, or a magnetic cassette. Alternatively, the program (software module or software) may be stored in a memory consisting of a combination of all or some of them. Furthermore, multiple configuration memories may be included.

Furthermore, the program may be stored in an attachable storage device which may be accessed over a communication network, such as the Internet, Intranet, a local area network (LAN), a wide LAN (WLAN), or a storage area network (SAN), or a communication network consisting of a combination of them. Such a storage device may access a device that performs an embodiment of the disclosure through an external port. Furthermore, a separate storage device in a communication network may access a device that performs an embodiment of the disclosure.

In the aforementioned detailed embodiments of the disclosure, the components included in the disclosure have been expressed in the singular or plural form depending on a proposed detailed embodiment. However, the singular or plural expression has been selected suitably for a situation proposed for convenience of description, and the disclosure is not limited to singular or plural components. Although a component has been expressed in the plural form, it may be configured in the singular form. Although a component has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

The invention claimed is:

1. A method of a session management function (SMF) entity in a communication system, comprising:
    performing a packet data unit (PDU) session establishment procedure or a first PDU session modification procedure;
    identifying that an ultra reliable low latency communication (URLLC) quality of service (QOS) flow established via a second PDU session modification procedure is created in a PDU session, wherein the URLLC QOS flow requires an always-on PDU session; and
    transmitting, to a user equipment (UE), a PDU session modification command message for the second PDU session modification procedure, wherein the PDU session modification command message includes an indicator indicating that the PDU session is the always-on PDU session based on identifying that the URLLC QOS flow is created in the PDU session, in case that the indicator has not been transmitted to the UE in the PDU session establishment procedure or the first PDU session modification procedure.

2. The method of claim 1, wherein a user plane resource for the always-on PDU session is established whenever the UE transitions from a connection management (CM)-IDLE mode to a CM-CONNECTED mode.

3. A method of a user equipment (UE) in a communication system, comprising:
    performing a packet data unit (PDU) session establishment procedure or a first PDU session modification procedure;
    and
    receiving, from a session management function (SMF), a PDU session modification command message for a second PDU session modification procedure, wherein the PDU session modification command message includes an indicator indicating that a PDU session is an always-on PDU session based on an ultra reliable low latency communication (URLLC) quality of service (QOS) flow established via the second PDU session modification procedure being created in the PDU session, in case that the indicator has not been received from the SMF in the PDU session establishment procedure or the first PDU session modification procedure, wherein the URLLC QOS flow requires the always-on PDU session.

4. The method of claim 3, wherein a user plane resource for the always-on PDU session is established whenever the UE transitions from a connection management (CM)-IDLE mode to a CM-CONNECTED mode.

5. A session management function (SMF) entity in a communication system, comprising:
    a transceiver; and
    a controller configured to:
        perform a packet data unit (PDU) session establishment procedure or a first PDU session modification procedure,
        identify that an ultra reliable low latency communication (URLLC) quality of service (QOS) flow established via a second PDU session modification procedure is created in a PDU session, wherein the URLLC QoS flow requires an always-on PDU session, and
        transmit, to a user equipment (UE), a PDU session modification command message for the second PDU session modification procedure, wherein the PDU session modification command message includes an indicator indicating that the PDU session is the always-on PDU session based on identifying that the URLLC QoS flow is created in the PDU session, in case that the indicator has not been transmitted to the UE in the PDU session establishment procedure or the first PDU session modification procedure.

6. The SMF entity of claim 5, wherein a user plane resource for always-on PDU session is established whenever the UE transitions from a connection management (CM)-IDLE mode to a CM-CONNECTED mode.

7. A user equipment (UE) in a communication system, comprising:
   a transceiver; and
   a controller configured to:
   perform a packet data unit (PDU) session establishment procedure or a first PDU session modification procedure,
   receive, from a session management function (SMF), a PDU session modification command message for a second PDU session modification procedure, wherein the PDU session modification command message includes an indicator indicating that a PDU session is an always-on PDU session based on an ultra reliable low latency communication (URLLC) quality of service (QOS) flow established via the second PDU session modification procedure being created in the PDU session, in case that the indicator has not been received from the SMF in the PDU session establishment procedure or the first PDU session modification procedure, wherein the URLLC QOS flow requires the always-on PDU session.

8. The UE of claim 7, wherein a user plane resource for the always-on PDU session is established whenever the UE transitions from a connection management (CM)-IDLE mode to a CM-CONNECTED mode.

* * * * *